Figure 1:
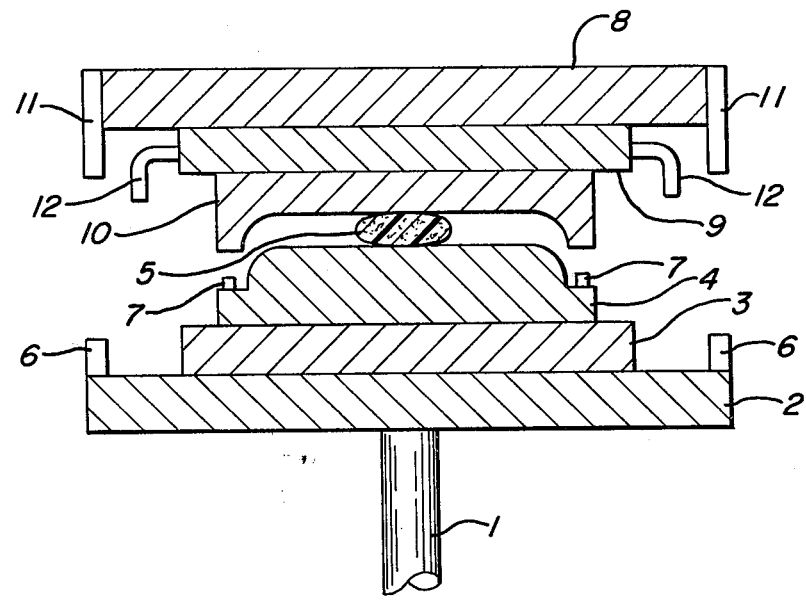

United States Patent [19]

Griffith et al.

[11] 4,438,062

[45] Mar. 20, 1984

[54] IN-MOLD COATING METHOD

[75] Inventors: Richard M. Griffith; Henry Shanoski, both of Akron, Ohio

[73] Assignee: The General Tire & Rubber Company, Akron, Ohio

[21] Appl. No.: 484,760

[22] Filed: Apr. 14, 1983

[51] Int. Cl.³ .............................. B29C 1/00; B29C 9/00
[52] U.S. Cl. ..................................... 264/255; 264/257
[58] Field of Search ........................ 264/255, 257, 310

[56] References Cited

U.S. PATENT DOCUMENTS

| | | | |
|---|---|---|---|
| 3,184,527 | 5/1965 | Fischer | 264/255 |
| 3,363,039 | 1/1968 | Nagai et al. | 264/255 |
| 3,396,214 | 8/1968 | Crandon | 264/255 |
| 3,488,747 | 1/1970 | Cleereman | 264/255 |
| 3,597,425 | 8/1971 | Shaines | 264/255 |
| 3,903,343 | 9/1975 | Pfaff | 264/255 |
| 4,076,788 | 2/1978 | Ditto | 264/255 |
| 4,081,578 | 3/1978 | Van Essen et al. | 264/255 |
| 4,235,833 | 11/1980 | Arnason et al. | 264/255 |
| 4,245,006 | 1/1981 | Shanoski | 264/255 |

FOREIGN PATENT DOCUMENTS

| | | | |
|---|---|---|---|
| 1281723 | 7/1972 | United Kingdom . | |
| 1457937 | 12/1976 | United Kingdom | 264/255 |

Primary Examiner—Willard E. Hoag

[57] ABSTRACT

An SMC (FRP) molding is coated with a minimum amount of an IMC composition by skewing one of the mold halves during the initial IMC molding cycle to effect a scissoring action, the fulcrum being at or about the IMC injection point or placement to spread or wipe the IMC over the surface of the SMC part and then effecting at least substantial parallelism of the mold halves during the remaining IMC cycle of coating and curing the IMC.

2 Claims, 2 Drawing Figures

IN-MOLD COATING METHOD

This invention relates to a method or process whereby deliberately causing non-parallelism in the opposing faces of a mold for SMC (FRP), the amount of in-mold coating composition (IMC) required to cover a part is substantially reduced.

BACKGROUND OF THE INVENTION

The in-mold coating process is described in U.S. Pat. No. 4,081,578, while the auxiliary forced-velocity leveling unit is described in U.S. Pat. No. 4,076,780.

The leveling unit is an arrangement of pistons around the periphery of the stationary mold half that act in opposition to the closing mold half, and serve to maintain the opposing mold faces parallel during closure. The total push-back pressure is adjustable, and is set to some fraction of the pressing tonnage. The individual pressure in a given piston will vary automatically with the requirements of maintaining parallelism; the pressure sum of all pistons, however, equals the pre-set value.

Ideally, the unit works as follows. During the initial SMC (sheet molding compound to make an FRP, glass fiber reinforced plastic part) molding, parallelism is essentially maintained, insuring more uniform part thickness, according to the mold's dimensions, with a minimum of the customary part to part and area to area thickness variability due to random press rocking during closure. After the SMC is cured, the main ram is turned off, while the leveling unit opens the press a pre-set amount, usually 25 to 100 mils. At this point, the in-mold coating is injected, ram pressure is turned on, and the press closes a second time with near parallelism, insuring that the coating spreads evenly and uniformly over the SMC surface. The IMC injector is located at an edge of the mold, and the injection port is an integral part of the mold.

In practice, the leveling unit minimizes non-parallelism but does not totally eliminate it. Several factors affect the degree of departure from non-parallelism, the main one being the initial location of the SMC charge placement. For example, if a charge is placed towards one end of the mold cavity, the leveling unit sometimes cannot totally overcome the resulting torque, and the molded part will tend to be thick at the charge location, thinning down towards the opposite side. With the leveling unit off, the degree of this slope would be much higher. Even with a centrally located charge, while the degree of non-parallelism is fairly low, the orientation of the slope will vary from part to part because of residual, random press rocking during closure.

According to experience, the minimum amount of in-mold coating needed for full part coverage is partly a function of the degree of non-parallelism of the base SMC part, and specifically the slope orientation with respect to the IMC injection port. The ideal orientation is the case where the part is thickest near the injection port, and thins down diagonally across the part away from this location. It is speculated that during the IMC cycle, with this orientation, the base part and the closing mold will come in contact at the thick section first (where the IMC puddle is located). The final few mils of closure will then sweep the coating across the base part in a scissors-like action as the closing halves are forces to conform to the skewed base part. Conversely, had the slope orientation been such that the thick section of the base part was located away from the IMC injection port, the coating would have to flow towards the fulcrum of the scissors action or, therefore, into a converging cavity. Experience shows that this situation requires a maximum of in-mold coating.

A manufacturer, for obvious reasons, does not wish to apply more coating than is needed for complete coverage. This minimum is usually determined by trial and error, a safety margin is added, and the injector is set to delivery this amount of coating. The difficulty is that the minimum coating required is a function of the base part's slope orientation which, even with leveling, has enough variability so that an unfavorable slope orientation would result in partial coverage. This in turn results in either expensive repair work or a scrap part.

Rather than increasing the "safety margin" as described above, it has become standard practice to place the SMC charge close to the IMC injection port, thus guaranteeing a favorable base part slope. The price paid for this approach, however, is three-fold. First, the purpose of the leveling unit is defeated, and the manufacturer reproducibly produces parts that are skewed in thickness. Secondly, the molder's charge placement options are eliminated. It is well known that with a complicated mold cavity that includes asymmetry, substructure, etc., many problems such as poorly placed knit lines, ripples, poor flow, etc. can be minimized by the proper choice of SMC charge placement. Thirdly, by restricting charge placement to an area close to the injection port, the flow path of the SMC may be excessively long, leading to glass orientation, resin rich areas, fracture, etc. at the point of furthest flow.

A second approach that has not been used extensively in practice is to shim the mold favorably during the SMC molding cycle, but removing the shims during the IMC molding cycle. In the normal course of molding, when fully closed the two halves of a mold are separated by metal blocks, called stops, placed around the edges of the platens. The thickness of these stops defines the minimum thickness that a part can be molded to. By placing a shim on a stop close to the IMC injection port, the molder can insure a favorably sloped part more or less independent of charge placement. This would give the desired "scissors action." While in principle removing the restriction on charge placement, this method still results in a skewed base part.

An object of the present invention is to avoid the difficulties alluded to above and to provide a method of making a FRP part from SMC wherein the outer surface of the SMC molding is at least essentially completely coated with a minimum amount of an IMC composition.

Figure 2:
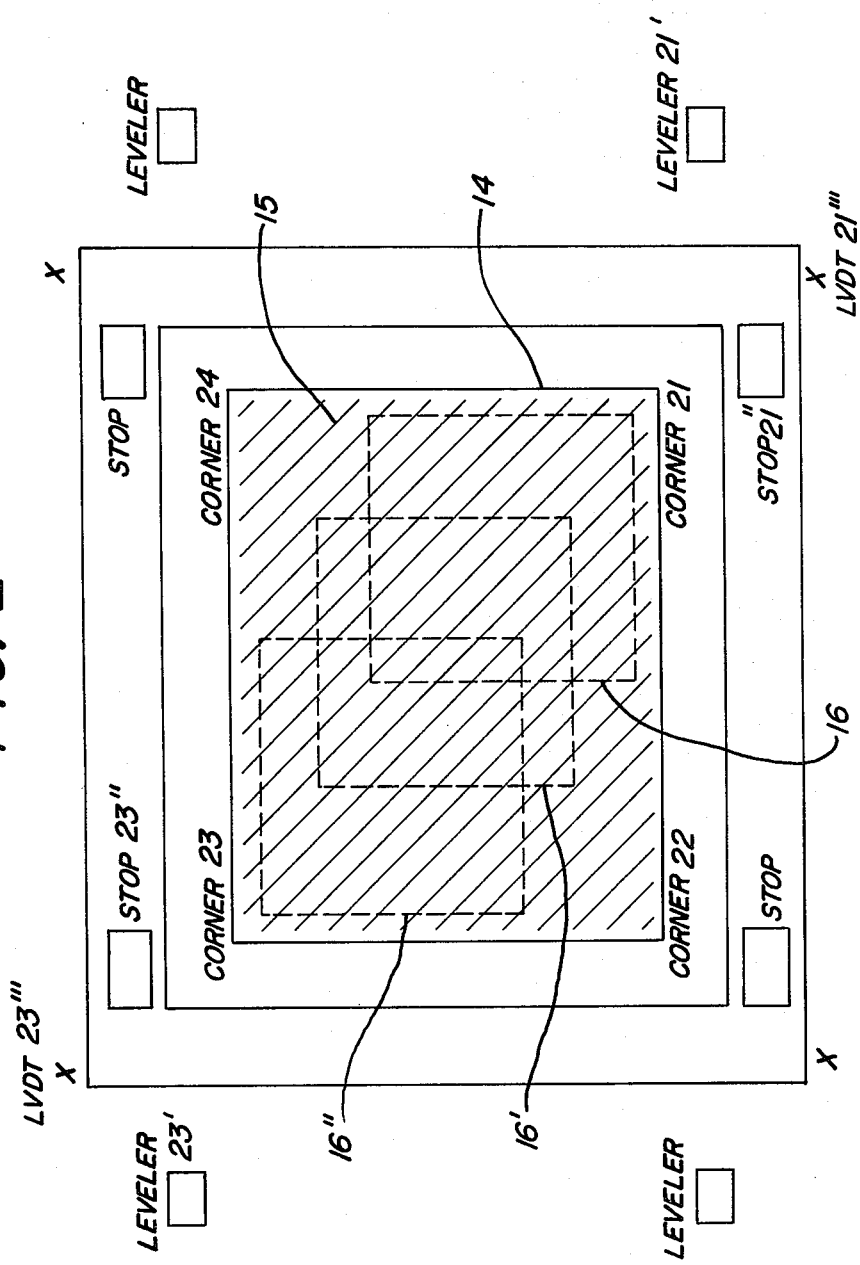

These and other objects and advantages of the present invention will become more apparent to those skilled in the art from the following detailed description, example and accompanying drawings in which FIG. 1 is a diagrammatic elevation of a portion of a hydraulic molding press useful in the practice of the present invention and FIG. 2 is a schematic top plan view of an arrangement of a hydraulic molding press for use in the practice of the present invention in accordance with the working Example.

STATEMENT OF THE INVENTION

According to the present invention the "scissors action" is attained not by molding a permanently skewed (unsymmetrical, slanted, obliquely) base part, but by programming the leveling unit so that the closing mold half is favorably skewed only, and temporarily, during the IMC coating cycle. In this way, a reproducible and minimum amount of coating is needed, while full advantage can be taken of the leveling unit to mold a SMC part of more uniform thickness. Ideally, the results should be independent of the initial SMC charge location. In other words, SMC charge placement is much less important.

Discussion of Details

Referring to the drawings FIG. 1 shows an example of a hydraulic molding press containing a vertically movable connecting rod 1 attached to a vertically movable press ram 2 containing heating plate or platen 3 supporting lower male mold 4 containing SMC charge 5. Press ram 2 also contains anvils 6, 6 while mold 4 contains stops 7, 7. Upper fixed bolster 8 carries upper platen 9 which in turn hold upper female mold 10. Attached to bolster 8 are levelers (hydraulic cylinders or leveling or push back pistons) 11, 11 while attached to upper platen 9 are LVDT's (linear variable differential transformers) 12, 12. The mold is operated or programmed using the levelers and LVDT's to effect parallelism during closing and molding as generally described in U.S. Pat. No. 4,076,780, above.

The following example will serve to illustrate the present invention with more particularity to those skilled in the art.

EXAMPLE

The SMC (for making the FRP part) used in this Example was a conventional composition of unsaturated polyester, styrene, polyvinyl acetate in styrene, calcium carbonate, zinc stearate, magnesium oxide, peroxide catalyst and glass fibers. The IMC composition comprised a diacrylate terminated polyesterurethane oligomer, a polyoxyethylene glycol dimethacrylate, polyvinylacetate, styrene, hydroxypropyl methacrylate, inhibitor, zinc stearate, cobalt octoate, conductive carbon black, talc and tertiary butyl perbenzoate.

A 16¾"×21¾" flat plate mold 14 was used. The location of stops, leveling pistons, and mounted LVDT's that were used to monitor press movement are shown in FIG. 2. The shaded area 15 represents the cavity. The ram pressure was kept at 210 tons, while the leveling pistons were adjusted to give a total of 40 tons pushback, for a net pressure of 930 psi on the molded part. The equipment available did not have an automatic IMC injector nor a programmable leveling system. The procedure used was to mold the base part, open the press fully, and pour a known amount of IMC in a puddle about 1" to 2" from corner 21. This represented the "injection port". The mold was then closed for the second cure cycle. This procedure was repeated with smaller amount of IMC, in 5-gm increments, until a non-fill occurred. This figure was reproducible to 5 grams. The SMC charge was a 10' square 16, 16' or 16", placed either 1" from corner 21, or corner 23 or centrally located. These 3 locations are represented in FIG. 2 by dashed lines (16, 16' or 16").

SMC parts are usually molded at a thickness of about 5 mils thicker than the cavity thickness defined by the stops. This insures positive pressure on the part during molding, no non-fills and a minimum waste of SMC material. In this study, two charge weights were used: a "low" and "high" weight that corresponded to a part thickness 2.5 mils and 20 mils thicker than the cavity on stops.

The work was designed to show how the minimum IMC needed for coverage is affected by (a) SMC charge placement, (b) skewing the mold halves during the SMC molding cycle and (c) skewing the mold halves temporarily during the IMC molding cycle.

A

Runs 1, 2 and 3 of the Table, below, show the effect of SMC charge placement. Since the IMC was always puddled in corner 21, the least amount of coating was required when the SMC charge was placed in corner 21. Conversely, the most coating was needed with the SMC placed in the least favorable location, e.g., corner 23. The same trend was seen with both SMC charge weights.

Runs 1 to 3, also, show that even though the mold halves are intended to be operated under conditions of parallelism during the SMC cycle, skewing nevertheless occurs. Since the SMC part is skewed, non-parallel conditions will exist during the subsequent IMC cycle. Hence, to obtain satisfactory minimum IMC coverage of the SMC molding, the SMC charge should be placed near the IMC injection port under these conditions.

B

Runs 4 through 9 of the Table show the effect of purposely skewing the mold halves during closing by placing a shim (a thin piece of metal) on one of the stops (21" or 23") during the SMC molding cycle. The shim was removed prior to in-mold coating. Shim thicknesses used varied with SMC weights, and were 10 and 40 mils at the low and high weights, respectively. This lifted one corner about 7 mils above the part's average thickness. Runs 4, 6 and 8 show that when the SMC part is given the preferred skewness by placing the shim at corner 21 on stop 21", the amount of IMC needed for complete coverage is low, and essentially independent of charge placement when SMC weight is low. At the high SMC weight, the shim was apparently not able to overcome fully the effect of an unfavorably placed SMC charge, although there still seemed to be some improvement. Runs 5, 7 and 9 show that when the shim is placed at an unfavorable location (stop 23"), the amount of IMC needed for coverage roughly doubles, regardless of SMC weight or placement.

In Runs 4, 6 and 8 the shim was on stop 21" during the SMC cycle so that the SMC was skewed favorably to the IMC placement. On closing the molds for the IMC cycle the IMC was at the fulcrum resulting in a scissoring action to more efficiently spread or wipe the IMC coating over the SMC part. Nevertheless, a considerable amount of IMC composition was used.

In Runs 5, 7 and 9 the shim was on stop 23" during the SMC cycle so that the SMC was skewed down towards the IMC placement. Here, the fulcrum was opposite from where the IMC was placed so that a favorable scissoring action could not take place.

No effort was made to determine the optimum shim thickness for a given SMC charge location. Perhaps a thicker shim would have given better results with the SMC adversely placed. However, although a 7-mil skew across a 27" part diagonal is not considered excessive, a molder might not want to go much higher because of possible press damage.

C

Runs 10 through 15 of the Table show the effect of skewing the mold halves during the IMC molding cycle. The procedure used was as follows. After molding the base part the normal way with leveling on, the press was opened fully. A shim was placed on the exposed face of one of the leveling pistons, IMC was poured in corner 21, and the press closed for the IMC cycle. As in the previous Runs, the shim thickness used varied with SMC weight. Since IMC is "injected" at corner 21, the preferred location for the shim is at leveler 23'. Runs 10, 12 and 14 show that when the shim is thus placed, the IMC needed for full coverage is low, and essentially independent of SMC weight or charge location. Examples 11, 13 and 15 describe the situation when a shim is placed at the least favorable location. In almost all cases, the amount of coating needed for full coverage is substantially more.

Here, since the shim in Runs 10, 12 and 14 was on leveler 23', during the IMC cycle, the mold closed at corner 23 before it closed at corner 21. Hence, a squeezing action occurred (fulcrum) at corner 21 where the IMC was located causing an effective resulting scissoring action. On the other hand in Runs 11, 13 and 15 the shim was on leveler 21' at corner 21 where the IMC was placed. On closing the mold during the IMC cycle the fulcrum was at corner 23, hence an effective scissoring of the IMC coating did not occur during Runs 11, 13 and 15.

In this series of Runs (10-15) the levelers having shims resisted the mold closing at the corners involved during the first part of the IMC mold closing to cause skewing of the mold and a scissoring action at least for Runs 10, 12 and 14, and during the latter part of the closing and curing the force of the ram partially overcame the resistance of the leveler having the shim to produce parallelism.

TABLE

| Run No. | Corner Location Of IMC | Corner Location Of SMC | Shim Cycle | Shim Location | Minimum IMC Grams Needed When SMC Weight Is Low | Minimum IMC Grams Needed When SMC Weight Is High |
|---|---|---|---|---|---|---|
| 1 | 21 | 21 | — | — | 17.5 | 12.5 |
| 2 | 21 | Center | — | — | 22.5 | 32.5 |
| 3 | 21 | 23 | — | — | 32.5 | 42.5 |
| 4 | 21 | 21 | SMC only | stop 21" | 17.5 | 17.5 |
| 5 | 21 | 21 | " | stop 23" | 37.5 | >60 |
| 6 | 21 | Center | " | stop 21" | 16.0 | 26.0 |
| 7 | 21 | Center | " | stop 23" | 32.5 | 52.5 |
| 8 | 21 | 23 | " | stop 21" | 22.5 | 31.0 |
| 9 | 21 | 23 | " | stop 23" | 41.0 | 65.0 |
| 10 | 21 | 21 | IMC only | leveler 23' | 17.5 | 7.5 |
| 11 | 21 | 21 | IMC only | leveler 21' | 17.5 | >70 |
| 12 | 21 | Center | " | leveler 23' | 12.5 | 11.0 |
| 13 | 21 | Center | " | leveler 21' | 41.0 | >60 |
| 14 | 21 | 23 | " | leveler 23' | 22.5 | 12.5 |
| 15 | 21 | 23 | " | leveler 21' | 42.5 | >60 |

The results show that using this method, a minimum of IMC was needed for SMC coverage, independent of SMC charge weight, and virtually independent of SMC charge location. The reduction in IMC needed for coverage averaged around 50%, depending on molding parameters. The data also showed a good inverse correlation between the amount of IMC needed for coverage and the amount of induced scissoring.

It should be noted that the method used to skew the mold during the IMC cycle as described above is only one of several possible methods. It was used to demonstrate operability, but would probably be less convenient in a production situation than programming a higher pressure in the push-back piston opposite from the IMC injection port (in the present case, piston 23') during and only during IMC close cycle (see (5) below). The procedure would be as follows:

(1) The base SMC part is molded as usual, with the leveling system acting to maintain parallelism.

(2) A few seconds before the leveler push-backs are due to open the mold slightly for the IMC injection cycle, extra pressure is induced in the leveling piston opposite the IMC port.

(3) The press opens in a skewed position, IMC is injected, and the press recloses, again in a skewed position.

(4) During the final close, ram pressure partially overcomes the extra push-back pressure in the opposite piston, to give the desired wiping or scissors action.

(5) A few seconds after full close, the extra pressure in the opposing piston 23' is reduced to its normal value, and the opposing mold part-cavity faces are allowed to assume as parallel a position as the system permits.

A fairly common but intermittent problem in in-mold coating is a phenomenon variously referred to as "rivering" or "streaking". Visually, these appear as white or clear dendritic-like channels in the coating, usually toward the end of a long flow path, or in areas of high shear. In severe cases, these areas are depressed and will telegraph through a paint top coat. They are the result of pigment segregation. Among factors that contribute to rivering are incompatibility of the pigment-organic media, low viscosity, and areas of high shear.

A distinguishing feature of the "scissors action" discussed above is that, during flow, the coating spreads towards a diverging cavity and should experience a minimum of shear. Thus, other factors being equal, a coating applied with the advantageous scissors action should river less.

A very limited number of moldings were made to test this hypothesis. Rivering was induced by decreasing the viscosity of IMC (diluting the IMC by adding more styrene). Dilution of the IMC was an attempt to exaggerate the situation since in small laboratory molds it is difficult to cause streaking in contrast to a factory mold. Six flat panels (16¾"×21¾") were molded and in-mold coated. The SMC (FRP) charge was alternately located at cavity corner 21, center and corner 23 as shown in FIG. 2. The first set of three were controls, the second set of three were molded with a shim at leveler 23' during the IMC cycle. SMC base part weight was 1360 grams (high weight in table) and IMC weight was 45 grams for all coatings, always hand poured in corner 21. The three controls all "rivered" in corner 23, in spite of the fact that the control with SMC in corner 21 experienced some scissoring because of the base part skewness. The three panels that were coated with a shim at leveler no. 23' showed no rivering or streaking. When the series was rerun at a lower SMC base weight (1160 grams), the results were inconclusive. Difficulty was experienced in inducing streaking and, as a result, it was necessary to decrease the IMC viscosity drastically. Perhaps as a result of this, all six panels were covered with a fine separation, with little difference between the six panels. Nevertheless, the success achieved in the first series of runs indicated that scissoring during the IMC cycle could, also, reduce rivering.

The glass fiber reinforced thermoset plastic (FRP) such as the polyester resin or vinyl ester resin and glass fiber composition substrate to which the in-mold composition (IMC) is applied can be a sheet molding compound (SMC) or a bulk molding compound (BMC), or other thermosetting FRP material as well as a high strength molding compound (HMC) or a thick molding compound. The FRP substrate can have from about 10 to 75% by weight of glass fibers. The SMC compound usually contains from about 25 to 30% by weight of glass fibers while the HMC compound may contain from about 55 to 60% by weight of glass fibers. The glass fiber reinforced thermoset plastic (FRP) substrate can be rigid or semirigid (may contain a flexibilizing moiety such as an adipate group in the polyester). The substrate, also, may contain other flexibilizing polymers, the elastomers and plastomers, such as the styrene-butadiene block copolymers. Unsaturated polyester glass fiber thermosets are known as shown by "Modern Plastics Encyclopedia," 1975-1976, October, 1975, Vol. 52, No. 10A, McGraw-Hill, Inc., New York, pages 61, 62 and 105 to 107; "Modern Plastics Encyclopedia," 1979-1980, October, 1979, Volume 56, Number 10A, pages 55, 56, 58, 147 and 148 and "Modern Plastics Encyclopedia," 1980-81, October, 1980, Volume 57, Number 10A, pages 59, 60 and 151 to 153, McGraw-Hill, Inc., New York, N.Y.

SMC compositions, IMC compositions, molding apparatus and machines for in-mold coating may be found in U.S. Pat. Nos. 4,076,780; 4,076,788; 4,081,578; 4,082,486; 4,187,274; 4,189,517; 4,222,929; 4,235,833; 4,239,796; 4,239,808; 4,245,006; 4,245,976; 4,329,134; 4,331,735; 4,367,192 and 4,374,238. Please see, also, "Proceedings Reinforced Plastics/Composites Institute," 31st Annual Conference, The Society of the Plastics Industry, Inc., February, 1976, Todd, Section 18-B, pages 1-5; "Modern Plastics," June, 1976, pages 54-56; "Proceedings of the Thirty-second Annual Conference Reinforced Plastics/Composites Institute," SPI, Washington, February, 1977, Griffith et al, Section 2-C, pages 1-3; "33rd Annual Technical Conference, 1978 Reinforced Plastics/Composites Institute The Society of the Plastics Industry, Inc.," SPI, Ongena, Section 14-B, pages 1-7 and "Reinforced Plastics/Composites Institute," 38th Annual Conference, The Society of the Plastics Industry, Inc., February, 1983, McClusky et al, Section 1-A, pages 1-6. The in-mold coating composition can be applied to the substrate and cured at a temperature of from about 290 to 310° F. and at a pressure of about 1000 p.s.i. for from about 0.5 to 3 minutes.

The processes and products of the present invention can be used in the manufacture of automobile parts such as grille and headlamp assemblies, deck hoods, fenders, door panels and roofs as well as in the manufacture of food trays, appliance and electrical components, furniture, machine covers and guards, bathroom components, structural panels and so forth.

We claim:

1. The method which comprises, in a heated compression mold having two halves forming a cavity for molding, (1) placing a SMC (sheet molding compound) charge in the cavity of one of said mold halves, (2) forcing one of said halves against the other while providing essentially parallelism between the mold halves as the mold is closed to spread the SMC throughout the mold, to mold the SMC and substantially to cure the SMC to form a molded FRP (glass fiber reinforced plastic) part, (3) slightly separating said mold halves and injecting an IMC (in-mold coating) composition onto the outer surface of the FRP part, (4) reclosing the mold halves while, in substantially the first or initial portion of said mold reclosing, skewing one of said mold halves relative to the other to effect a scissoring action between the mold halves with the fulcrum being essentially at about said IMC injection port and where said IMC was injected in order or sweep or wipe said IMC composition across the surface of the SMC part and, in the latter portion of said mold reclosing, effecting at least substantial parallelism between the mold halves to complete the coating of the SMC with the IMC composition, and (5), in said finally closed mold, curing said IMC to said FRP, said IMC composition at least essentially completely coating the outer surface of said FRP part with a minimum thickness of said IMC composition.

2. The method according to claim 1 where the SMC charge is placed in the mold half near the IMC injection port.

* * * * *